United States Patent
Hua et al.

(10) Patent No.: US 8,645,123 B2
(45) Date of Patent: Feb. 4, 2014

(54) IMAGE-BASED SEMANTIC DISTANCE

(75) Inventors: Xian-Sheng Hua, Beijing (CN); Lei Wu, Hefei (CN); Shipeng Li, Beijing (CN)

(73) Assignee: Microsoft Corporation, Redmond, WA (US)

( * ) Notice: Subject to any disclaimer, the term of this patent is extended or adjusted under 35 U.S.C. 154(b) by 1089 days.

(21) Appl. No.: 12/340,632

(22) Filed: Dec. 19, 2008

(65) Prior Publication Data

US 2010/0106486 A1    Apr. 29, 2010

Related U.S. Application Data

(60) Provisional application No. 61/108,739, filed on Oct. 27, 2008.

(51) Int. Cl.
  *G06F 17/27* (2006.01)
  *G06F 17/20* (2006.01)
  *G06F 17/21* (2006.01)

(52) U.S. Cl.
  USPC ..................... 704/9; 704/1; 704/10

(58) Field of Classification Search
  None
  See application file for complete search history.

(56) References Cited

U.S. PATENT DOCUMENTS

| | | | |
|---|---|---|---|
| 6,404,925 B1 * | 6/2002 | Foote et al. | 382/224 |
| 6,847,980 B1 | 1/2005 | Benitez et al. | |
| 7,043,474 B2 | 5/2006 | Mojsilovic et al. | |
| 7,308,140 B2 | 12/2007 | Shin et al. | |
| 7,552,116 B2 * | 6/2009 | Chang et al. | 1/1 |
| 7,890,512 B2 * | 2/2011 | Mei et al. | 707/737 |
| 8,126,274 B2 * | 2/2012 | Li et al. | 382/224 |
| 2008/0162561 A1 | 7/2008 | Naphade et al. | |

OTHER PUBLICATIONS

Aksoy et al. "Learning Bayesian Classifiers for Scene Classification with a Visual Grammar". IEEE Transactions on Geoscience and Remote Sensing, vol. 43 No. 3, Mar. 2005.*
Endres et al. "A New Metric for Probability Distributions". IEEE Transactions on Information Theory, vol. 49, No. 7, Jul. 2003.*
Fan et al. "Multi-Level Annotation of Natural Scenes Using Dominant Image Components and Semantic Concepts". Proceedings of the 12th Annual ACM Conference on Multimedia, Oct. 2004.*
Jin et al. "Effective Automatic Image Annotation Via a Coherent Language Model and Active Learning". Proceedings of the International Workshop on Multimedia Information Retrieval, 2004.*
Kamps et al. Using WordNet to Measure Semantic Orientations of Adjectives. In Proceedings of LREC-04, 4th International Conference on Language Resources and Evaluation, vol. IV.*
Wu et al. "Visual Language Modeling for Image Classification". Proceedings of the International Workshop on Multimedia Information Retrieval. Ausburg, Germany, Sep. 24-29, 2007.*
Yang et al. "Evaluating bag-of-visual-words representations in scene classification". Proceedings of the International Workshop on Multimedia Information Retrieval. Ausburg, Germany, Sep. 24-29, 2007.*

(Continued)

*Primary Examiner* — Jesse Pullias
(74) *Attorney, Agent, or Firm* — Carole Boelitz; Micky Minhas

(57) ABSTRACT

Image-based semantic distance technique embodiments are presented that involve establishing a measure of an image-based semantic distance between semantic concepts. Generally, this entails respectively computing a semantic concept representation for each concept based on a collection of images associated with the concept. A degree of difference is then computed between two semantic concept representations to produce the aforementioned semantic distance measure for the pair of corresponding concepts.

20 Claims, 2 Drawing Sheets

(56) References Cited

OTHER PUBLICATIONS

Al-Khatib, W., Y. F. Day, A. Ghafoor, P. B. Berra, Semantic modeling and knowledge representation in multimedia databases, IEEE Trans. Knowl. Data Eng., Jan./Feb. 1999, pp. 64-80, vol. 11, No. 1.

Berka, P., T. Athanasiadis, Y. S. Avrithis, Rule-based reasoning for semantic image segmentation and interpretation, Poster and Demo Proc. of the 1st Int'l Conf. on Semantic and Digital Media Technologies, Athens, Greece, Dec. 6-8, 2006.

Borgatti, S., Netdraw, retrieved Nov. 10, 2011 from http://www.analytictech.com/netdraw/netdraw.htm.

Chang, S.-F., D. Ellis, W. Jiang, K. Lee, A. Yanagawa, A. C. Loui, J. Luo, Large-scale multimodal semantic concept detection for consumer video, Proc. of the 9th ACM SIGMM Int'l Workshop on Multimedia Info. Retrieval, pp. 255-264, Sep. 24-29, 2007, Augsburg, Bavaria, Germany.

Chen, Y., J. Z. Wang, Image categorization by learning and reasoning with regions, J. of Machine Learning Research, Aug. 2004, vol. 5, pp. 913-939.

Cilibrasi, R., P. M. B. Vitanyi, The Google similarity distance, IEEE Trans. Knowl. Data Eng., Mar. 2007, vol. 19, No. 3, pp. 370-383.

Datta, R., D. Joshi, J. Li, J. Z. Wang, Image retrieval: Ideas, influences, and trends of the new age, ACM Comput. Surv., vol. 40, No. 2, Apr. 2008.

Fei-Fei, L., P. Perona, A Bayesian hierarchical model for learning natural scene categories, IEEE Comp. Society Conf. on Comp. Vision and Pattern Recognition, Jun. 2005, pp. 524-531, San Diego, CA, USA.

Hofmann, T., Probabilistic latent semantic indexing, Proc. of the 22nd Annual Int'l ACM SIGIR Conf. on Research and Development in Info. Retrieval, Aug. 1999, pp. 50-57, Berkeley, CA, USA.

Hua, X.-S. and G.-J. Qi, Online multi-label active learning for large-scale multimedia annotation, TechReport MSR-TR-2008-103, Jun. 2008, pp. 1-10, Microsoft Research.

Huang, T. S., Dagli, C. K., Rajaram, S., Chang, E. Y., Mandel, M. I., Poliner, G. E., Ellis, D. P. W., Active learning for interactive multimedia retrieval, Proc. of the IEEE, Apr. 2008, vol. 96, No. 4, pp. 648-667.

Jeon, J., V. Lavrenko, R. Manmatha, Automatic image annotation and retrieval using cross-media relevance models, Proc. of the 26th Annual Int'l ACM SIGIR Conf. on Research and Development in Info. Retrieval, Jul. 28-Aug. 1, 2003, pp. 119-126, Toronto, Canada.

Lavrenko, V., R. Manmatha, J. Jeon, A model for learning the semantics of pictures, Advances in Neural Information Processing Systems, Dec. 2003, Vancouver and Whistler, British Columbia, Canada.

Lenat, D. B., CYC: A large-scale investment in knowledge infrastructure, Commun. of the ACM, Nov. 1995, vol. 38, No. 11, pp. 32-38.

Leslie, L., T.-S. Chua, R. Jain, Annotation of paintings with high-level semantic concepts using transductive inference and ontology-based concept disambiguation, Proc. of the 15th Int'l Conf. on Multimedia, pp. 443-452, Sep. 2007, Augsburg, Germany.

Liu, J., B. Wang, M. Li, Z. Li, W.-Y. Ma, H. Lu, S. Ma, Dual cross-media relevance model for image annotation, Proc. of the 15th Int'l Conf. on Multimedia, Sep. 2007, pp. 605-614, Augsburg, Germany.

Liu, H., S. Jiang, Q. Huang, C. Xu, W. Gao, Region-based visual attention analysis with its application in image browsing on small displays, Proc. of the 15th Int'l Conf. on Multimedia, Sep. 2007, pp. 305-308, Augsburg, Germany.

Natsev, A. P., A. Haubold, J., J. Tesic, L. Xie, R. Yan, Semantic concept-based query expansion and re-ranking for multimedia retrieval, Proc. of the 15th Int'l Conf. on Multimedia 2007, Sep. 2007, pp. 991-1000, Augsburg, Germany.

Qi, G.-J., X.-S. Hua, Y. Rui, J. Tang, T. Mei, H.-J. Zhang, Correlative multi-label video annotation, Proc. of the 15th Int'l Conf. on Multimedia, Sep. 2007, pp. 17-26, Augsburg, Germany.

Shevade, B., H. Sundaram, A visual annotation framework using common-sensical and linguistic relationships for semantic media retrieval, Third Int'l Workshop Adaptive Multimedia Retrieval: User, Context, and Feedback, AMR 2005, Jul. 2005, pp. 251-265, Glasgow, UK.

Smeaton, A. F., I. Quigley, Experiments on using semantic distances between words in image caption retrieval, Proc. of the 19th Annual Int'l ACM SIGIR Conf. on Research and Development in Info. Retrieval, Aug. 18-22, 1996, pp. 174-180, Zurich, Switzerland.

Stathopoulos, V., J. Urban, J. M. Jose, Semantic relationships in multi-modal graphs for automatic image annotation, Proc. of the 30th European Conf. on IR Research, Advances in Information Retrieval, Mar. 30-Apr. 3, 2008, pp. 490-497, Glasgow, UK.

Wang, C., F. Jing, L. Zhang, H.-J. Zhang, Content-based image annotation refinement, IEEE Comp. Society Conf. on Comp. Vision and Pattern Recognition, Jun. 2007, pp. 1-8, Minneapolis, Minnesota, USA.

Wang, B., Z. Li, M. Li, W.-Y. Ma, Large-scale duplicate detection for web image search, Proc. of the 2006 IEEE Int'l Conf. on Multimedia and Expo, Jul. 2006, pp. 353-356, Toronto, Ontario, Canada.

Wu, L., J. Liu, N. Yu, M. Li, Query oriented subspace shifting for near-duplicate image detection, Proc. of the 2008 IEEE Int'l Conf. on Multimedia and Expo, Jun. 2008, pp. 661-664, Hannover, Germany.

Yu, J., Q. Tian, Semantic subspace projection and its applications in image retrieval, IEEE Trans. Circuits Syst. Video Techn., vol. 18, No. 4, Apr. 2008, pp. 544-548.

Wang, D., X. Li, J. Li, B. Zhang, The importance of query-concept-mapping for automatic video retrieval, Proc. of the 15th Int'l Conf. on Multimedia, MM'07, Sep. 23-28, 2007, pp. 285-288, Augsburg, Bavaria, Germany.

\* cited by examiner

IMAGE-BASED SEMANTIC DISTANCE

BACKGROUND

Exploring the semantic relationship between concepts is a hot research topic recently, since it has wide application on natural language processing, object detection, and multimedia retrieval, among others. It is important to note that the semantic relationship is more than synonym (e.g., football-soccer) and concept similarity (e.g., horse-donkey). It also includes relationships such as meronymy (e.g. car-wheel) and concurrence (e.g. airplane-airport). In this context, concurrence denotes that two concepts may appear simultaneously in daily life rather than in the textual documents. More broadly, the term "concurrence" can represent concept co-occurrence or background coherence in the visual domain, as opposed to the term "similarity" which can represent concept co-occurrence in textual documents.

SUMMARY

Image-based semantic distance technique embodiments described herein involve establishing a measure of an image-based semantic distance between semantic concepts. Generally, this entails respectively computing a semantic concept representation for each concept based on a collection of images associated with the concept. A degree of difference is then computed between two semantic concept representations to produce the aforementioned semantic distance measure for that pair of concepts. In some embodiments, the semantic concept representation takes the form of a statistical language model of the images associated with the semantic concept under consideration, and the degree of difference takes the form of a statistical distribution divergence measure.

Some embodiments also include a latent semantic analysis to capture variations in the appearance of a concept in a collection of related images used to compute the semantic concept representations. In such embodiments, establishing the image-based semantic distance measure between semantic concepts generally entails computing a semantic concept representation for each semantic concept based on images associated with the concept, where each of the representations accounts for variations in the appearance of the associated semantic concept. Once the semantic concept representations are in place, a degree of difference is computed between the pair of semantic concept representations to produce a semantic distance measure. In this case, a combination of the degree of differences is computed between each appearance variation associated with a first of the semantic concept representations and each appearance variation associated with the other of the semantic concept representations.

It should be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter.

DESCRIPTION OF THE DRAWINGS

The specific features, aspects, and advantages of the disclosure will become better understood with regard to the following description, appended claims, and accompanying drawings where:

DETAILED DESCRIPTION

In the following description of image-based semantic distance technique embodiments reference is made to the accompanying drawings which form a part hereof, and in which are shown, by way of illustration, specific embodiments in which the technique may be practiced. It is understood that other embodiments may be utilized and structural changes may be made without departing from the scope of the technique.

1.0 Image-Based Semantic Distance

A relationship between semantic concepts can involve synonym (e.g., football-soccer), or similarity (e.g., horse-donkey). It also includes relationships such as meronymy (e.g., car-wheel) and concurrence (e.g., airplane-airport). Some semantic concepts are more closely related, such as "airplane" and "airport", and some are more alienated, such as "acropolis" and "alcohol". The image-based semantic distance technique embodiments described herein provide a way to quantify the closeness of the relationship between concepts using images depicting the concepts. As the relationship between semantic concepts is the knowledge of human perception, and 80% of human cognition comes from visual information, it is reasonable to generate artificial knowledge about concept relationship by visual correlation rather than by concept co-occurrence in textual documents. In addition, the correlation in visual domain is not only represented by the frequency of low level visual features in the images, but can also employ spatial information between these low level visual features in the image. For example, the same visual feature (i.e., a wheel) frequently co-occurs in "car" and "motorbike" images, but their neighboring features are different. Owing to the ignorance of spatial information between visual features, these two concepts can be confused. However, if the neighboring information of these visual features is considered, the relation between the concepts is clearer. Thus, the arrangement of the visual features is also informative in representing the concept.

Figure 1:
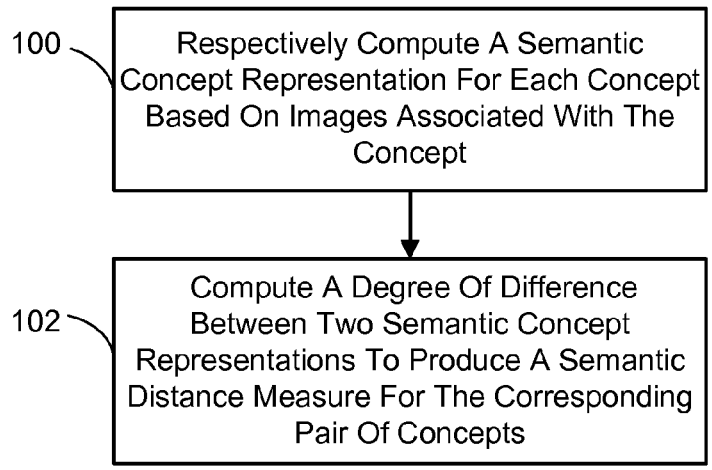
FIG. 1 is a flow diagram generally outlining one embodiment of a process for establishing a measure of an image-based semantic distance between semantic concepts.

In view of the foregoing, image-based semantic distance technique embodiments described herein provide for establishing a measure of an image-based semantic distance between semantic concepts. Referring to FIG. 1, this generally involves first respectively computing a semantic concept representation for each concept based on images associated with the concept (100). A degree of difference is then computed between two semantic concept representations to produce the aforementioned semantic distance measure for that pair of representations (102). In some embodiments, the semantic concept representation takes the form of a statistical distribution model of the images associated with the semantic concept under consideration, and the degree of difference takes the form of a statistical distribution divergence measure (also sometimes referred to as a statistical distribution distance measure).

Figure 2:
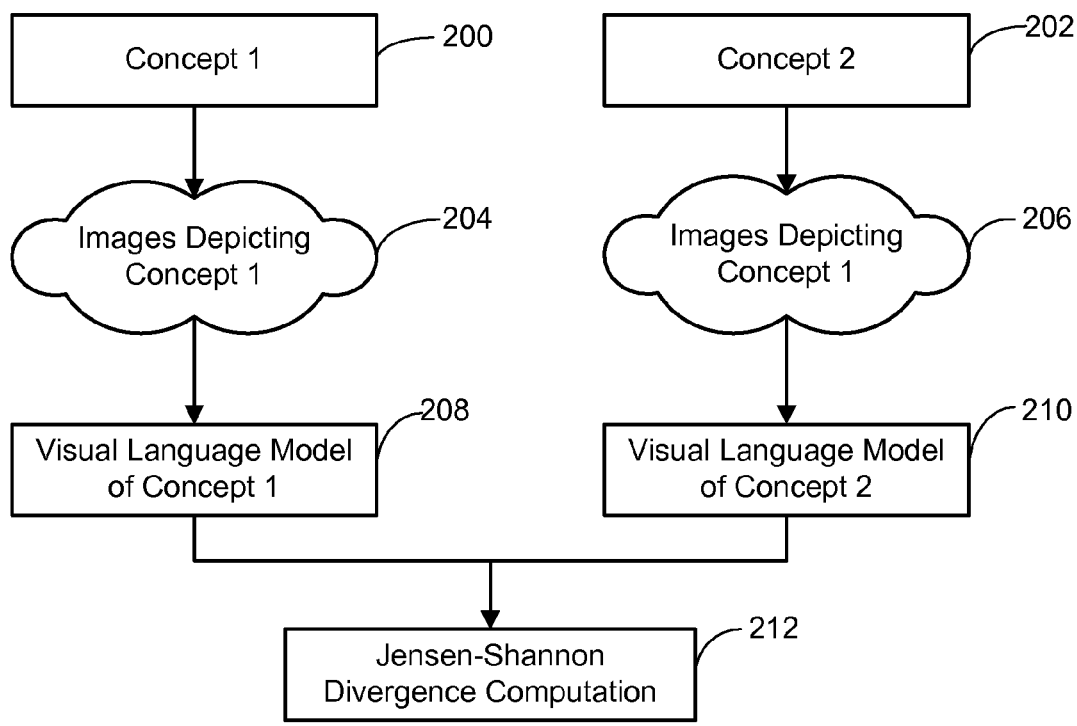
FIG. 2 is a block diagram illustrating an implementation of the process of FIG. 1, employing visual language models and Jensen-Shannon divergence for establishing the image-based semantic distance measure between semantic concepts.

More particularly, as shown in FIG. 2, the image-based semantic distance technique embodiments described herein, are a novel measurement of the relationship between semantic concepts 200, 202 (e.g., objects, scenes) in the visual domain. For each concept, a collection of images 204, 206 is obtained, based on which, in one embodiment, a visual language model 208, 210 is built to capture the visual characteristic of the concept. An image-based semantic distance between different concepts is then measured, which in one embodiment takes the form of a Jensen-Shannon (JS) divergence computation between the corresponding visual language models 212.

1.1 Semantic Concept Image Pool

As mentioned previously, since 80% of the human cognition comes from visual information, it makes sense to measure the semantic distance between concepts by their concurrence in daily life. To simulate concept concurrence in daily life, the concept relation learning process should be performed in daily life environment. Similar to the human observation system, the digital cameras in the world are recording the realistic daily life every day. Statistical semantic relations between concepts can be mined from a large pool of the daily life photos. To achieve a less biased estimation of the statistical concept relations, the image pool should be very large and the source of the images should be independent.

Luckily, there are web-based image pools available, which include images that are tagged with terms descriptive of the associated image. These terms often relate to a semantic concept of interest. For example, there is an on-line photo sharing website Flickr®. This site has collected more than $10^9$ images that have been uploaded by independent users. In addition, a large number of these images have been labeled (i.e., tagged). Thus, it is an ideal dataset for learning concept semantic relations.

To provide an unbiased estimation of the semantic distance between concepts, a sufficiently large and unbiased image dataset is needed. In addition, the images in the dataset should include the connection information between images and concepts. These are met by taking the Flickr® photo collection as the image pool. In one embodiment, only a prescribed number (e.g., 1000) of the top returned images tagged with the querying concept are used to represent each query concept. This avoids a problem of noisy tags.

1.2 Semantic Concept Representation

To analyze the concept correlation in a photo pool, the aforementioned semantic concept representation is employed. This representation can take the form of a statistical distribution model of the images associated with the semantic concept. There are many models in computer vision that can be used, such as the bag of words (BOW) model and regions of interest (ROI) based models. However, in one embodiment of the image-based semantic distance technique, a visual language model (VLM) is used. A VLM is an efficient visual statistical analysis method that captures not only local appearance features but also their spatial dependence. This is more discriminative in characterizing a semantic concept than the pure visual feature distribution, as described previously. The training of a VLM is fast, which makes the modeling method especially suitable for a large scale concept dataset. The output of a VLM is a conditional distribution of visual features of the image patches, based on which a strict distance metric can be defined. A VLM can also depress noise. The images that actually contain the target concept will share some visual features, which actually contribute to the model. Visual features in noisy samples, which are tagged by mistake, have little influence on the final VLM.

In operation, the VLM captures the statistical semantics of the images by analyzing the spatial dependency between neighboring image patches. Thus, the statistical semantics are represented as the image local features and their spatial dependency. More particularly, for each semantic concept, a collection of related images is obtained with the help of the aforementioned descriptive tags. It is assumed that images tagged with the same concept share similar appearance features as well as their arrangement patterns. This forms the statistical semantic of the concept. Each image is divided into equal-sized patches, and VLM is then used to calculate the conditional dependence between these patches to capture the visual statistical semantics of the concept.

1.2.1 Latent Topic Visual Language Model

In another embodiment of the image-based semantic distance technique, a latent semantic analysis is incorporated into the VLM to capture concept appearance variation. A traditional VLM can be deficient in handling concept appearance variation. This includes appearance variation due to scale (e.g., close/perspective shots) and orientation (e.g., side/front views), and other attributes such as object shape, illumination, color, texture, and so on. In such cases, it is possible to incorporate a latent topic analysis into the VLM, and assume each appearance variation of a concept corresponds to a latent topic $z_i$. Probabilistic latent semantic analysis (pLSA) can be adopted to analyze the visual characteristics of the concept under each variation of interest to the user. In the following paragraphs, this latent topic visual language model is described in more detail, beginning with a feature extraction phase and ending in a latent topic VLM generation phase.

In one embodiment of the feature extraction phase, each image is divided into uniformly sampled equal-sized patches. This is appropriate since the uniform sampling requires little computational cost and its performance is comparable to other methods using salient detection or segmentation based local regions—although these other methods (and the like) could be employed instead if desired. For each patch, an 8-dimensional texture histogram is then used to describe it. Each dimension corresponds to the texture gradient along one of eight quantized directions. Conventional methods can be used to calculate the texture histogram. Next, the texture histogram of each patch is converted into a visual word $w_{xy}$. In one embodiment, a hash coding scheme is employed.

The latent topic VLM generation phase generally involves incorporating the latent topic (appearance variation) analysis into the VLM to characterize each concept $C_i$ from the low level visual features arrangement. It provides an efficient way to model the concept. Each VLM is presented in the form of the conditional distributions, which describe the spatial dependence between the low level visual features given its neighbors and the latent topic.

A visual language model can be sub-categorized into unigram, bigram, trigram, or in general any n-gram models, according to the number of neighboring visual words considered. The unigram model assumes that the visual words are independent of each other. This model actually captures the visual word distribution. The bigram model assumes that the visual word is dependent on one of its neighboring features, e.g., the nearest left neighbor. This model calculates the conditional probability of each visual word given one of its neighboring words. The trigram model assumes that the visual word is dependent on two of its neighboring words, e.g., the nearest left and nearest up neighbors. Thus, in general, an n-gram model assumes that the visual word is dependent on n-1 of its neighboring words. However, it should be noted that while higher order models might be more discriminative, as the order of the model increases, the number of parameters will increase exponentially. Since the parameters are estimated from the occurrence of n-gram in the training set, if the order n is too large, the comparatively limited training set will suffer a sparseness problem. Thus, there is a tradeoff between discrimination and sparseness.

In addition, it is also possible to employ a combination model. In a combination model more than one n-gram model is used to generate parameters. For example, a conditional distribution associated with a VLM could be computed from parameters generated using first a bigram approach and then a trigram approach. Any combination of approaches can be employed. However, while using combinations of approaches might produce more discriminative results, the increase in the number of parameters will increase processing costs. Thus, there is a tradeoff between discrimination and cost.

In tested embodiments, the trigram model was chosen to capture the concepts, although as indicated previously larger or lesser (or combination) order models could be employed instead. In a trigram model the idea is to estimate the conditional distribution $$P(w_{xy} | w_{x-1,y}^2, C), \quad (1)$$

where C is the semantic concept, and $w_{x-1,y}^2$ represents the bigram $w_{x-1,y} w_{x,y-1}$. Since the visual concept may have various appearances, the use of multiple models to represent a concept is appropriate. To this end a latent variable z is introduced to represent the concept variation. Since this variable is hidden, pLSA is incorporated into VLM to model the concept under each variation.

Thus, a latent topic VLM estimates $P(w_{xy} | w_{x-1,y}^2, z_k^C)$, where $z_k^C$ represents the $k^{th}$ appearance variation of concept C. This latent topic trigram modeling process can be formulated as follows.

$$P(w_{xy} | w_{x-1,y}^2, d_j) = \sum_{k=1}^{K} P(w_{xy} | w_{x-1,y}^2, z_k^C) P(z_k^C | d_j) \quad (2)$$

$$x = 1, \ldots, m; y = 1, \ldots, n; j = 1, \ldots, N.$$

where $d_j^C$ represents the $j^{th}$ image in concept C. $z_k^C$ is the $k^{th}$ latent topic in concept C. K is the total number of latent topics, which can be determined empirically. An expectation-maximization (EM) technique is adopted to estimate both parameters $P(w_{xy} | w_{x-1,y}^2, z_k^C)$ and $P(z_k^C | d_j)$. The object function of the EM technique is to maximize the joint distribution of the concept and its visual word arrangement $A_w$.

$$\text{maximize } p(A_w, C) \quad (3)$$

$$p(A_w, C) \prod_{d_j \in C} \prod_{x,y} P(w_{xy} | w_{x-1,y} w_{x,y-1}, d_j) \quad (4)$$

In order to obtain analytically tractable density estimation, a cross-updating scheme is used in which $P(w_{xy}^3 | z_k^C)$ and $P(w_{x-1,y}^2 | z_k^C)$ are simultaneously estimated. Then, $P(w_{xy} | w_{x-1,y}^2, z_k^C)$ is calculated by these two estimations (Eq. (11)). The E step and M step are performed as follows.

E step:

$$Q_2(z_k^C | d_j^C, w_{x-1,y}^2) \leftarrow P(z_k^C | d_j^C) P(w_{x-1,y}^2 | z_k^C) \quad (5)$$

$$Q_3(z_k^C | d_j^C, w_{xy}^3) \leftarrow P(z_k^C | d_j^C) P(w_{xy}^3 | z_k^C) \quad (6)$$

$$Q(z_k^C | d_j^C, w_{xy}^3) \leftarrow P(z_k^C | d_j^C) P(w_{xy} | w_{x-1,y}^2, z_k^C) \quad (7)$$

M step:

$$P(w_{x-1,y}^2 | z_k^C) \leftarrow \frac{\sum_j n(d_j^C, w_{x-1,y}^2) Q_2(z_k^C | d_k^C, w_{x-1,y}^2)}{\sum_{x,y,j} n(d_j^C, w_{x-1,y}^2) Q_2(z_k^C | d_k^C, w_{x-1,y}^2)} \quad (8)$$

$$P(w_{xy}^3 | z_k^C) \leftarrow \frac{\sum_j n(d_j^C, w_{xy}^3) Q_3(z_k^C | d_j^C, w_{xy}^3)}{\sum_{x,y,j} n(d_j^C, w_{xy}^3) Q_3(z_k^C | d_j^C, w_{xy}^3)} \quad (9)$$

$$P(z_k^C | d_j^C) \leftarrow \frac{\sum_{xy} n(d_j^C, w_{xy}^3) Q(z_k^C | d_j^C, w_{xy}^3)}{\sum_{x,y,j} n(d_j^C, w_{xy}^3) Q(z_k^C | d_j^C, w_{xy}^3)} \quad (10)$$

$$P(w_{xy} | w_{x-1,y}^2, z_k^C) \leftarrow \frac{P(w_{xy}^3 | z_k^C)}{P(w_{x-1,y}^2 | z_k^C)} \quad (11)$$

$$P(z_k^C | C) \leftarrow \sum_{d^C \in C} P(z_k^C | d^C, C) P(d^C | C) \quad (12)$$

The outputs are the conditional distributions of trigrams for each latent topic, $P(w_{xy} | w_{x-1,y}^2, z_k^C)$, k=1, ..., K.

1.3 Semantic Distance Measure

To measure the distance between a pair of semantic concept representations, in one embodiment, the square root of a Jensen-Shannon (JS) divergence between the representations is calculated. If two concepts are more likely to be related, the square root of JS divergence of their visual language models tends to be small; otherwise large. Both JS and Kullback-Leibler (KL) divergence are commonly used similarity measurement between two distributions. While KL can be used, JS divergence has been demonstrated to be symmetric and satisfies triangle inequality. It is also known that the square root of the Jensen-Shannon divergence is a metric. Since it is desired to define a distance metric between concepts, using the square root of JS divergence is appropriate.

In embodiments of the image-based semantic distance technique that account for concept appearance variations using latent topic VLMs, the distance is generally defined as the square root of the sum of the Jensen-Shannon divergence between each conditional distribution associated with a first of the semantic concept representations in a pair and each conditional distribution associated with the other of the semantic concept representations in the pair.

For example, in the case where a trigram approach is used to compute the conditional distributions of latent topic VLMs, let $$P_{z_i} C_1 \text{ and } P_{z_j} C_2$$

be the trigram conditional distributions under latent topic $z_i^{C_1}$ and $z_j^{C_2}$ respectively. $z_i^{C_1}$ represents the $i^{th}$ latent topic of concept $C_1$ and $z_j^{C_2}$ represents the $j^{th}$ latent topic of concept $C_2$. The K-L divergence between them is defined to be $$D_{KL}(P_{z_i} C_1 | P_{z_j} C_2) = \sum_l P_{z_i} C_1(l) \log \frac{P_{z_i} C_1(l)}{P_{z_j} C_2(l)} \quad (13)$$

where $$P_{z_i}c_1(l), P_{z_j}c_2(l)$$

correspond to the probability density of the $l^{th}$ trigram in these two distributions respectively. In the view of information theory, the KL divergency is in fact a measurement of the mutual entropy between the two visual language models.

$$D_{KL}(P_{z_i}c_1 | P_{z_j}c_2) = -\sum_l P_{z_i}c_1(l)\log P_{z_j}c_2(l) + \sum_l P_{z_i}c_1(l)\log P_{z_i}c_1(l) \quad (14)$$

$$= H(P_{z_i}c_1, P_{z_j}c_2) - H(P_{z_i}c_1)$$

where $$H(P_{z_i}c_1, P_{z_j}c_2)$$

is the cross entropy of the two distributions, and $$H(P_{z_i}c_1)$$

is the entropy of $$P_{z_i}c_1.$$

According to the Gibbs' inequality, $$D_{KL}(P_{z_i}c_1 | P_{z_i}c_1) \geq 0.$$

It is zero if and only if $$P_{z_i}c_1 \text{ equals } P_{z_i}c_1$$

JS divergence is defined based on KL divergence to define the distance metric between these visual language models (Eq. (15)).

$$D_{JS}(P_{z_i}c_1 | P_{z_j}c_2) = \frac{1}{2}D_{KL}(P_{z_i}c_1 | M) + \frac{1}{2}D_{KL}(P_{z_j}c_2 | M) \quad (15)$$

$$M = \frac{1}{2}(P_{z_i}c_1 + P_{z_j}c_2) \quad (16)$$

where M is the average of $$P_{z_i}c_1 \text{ and } P_{z_j}c_2.$$

It has been demonstrated that the square root of the Jensen-Shannon divergence is a metric. In view of this, the image-based semantic distance between two concepts $C_1$ and $C_2$ can be calculated in one embodiment as the square root of the sum of weighted JS divergences computed between each conditional distribution associated with the latent topic VLM of concept $C_1$ and each conditional distribution associated with the latent topic VLM of concept $C_2$ as follows:

$$D(C_1, C_2) = \sqrt{\sum_{i=1}^{K}\sum_{j=1}^{K} P(z_i^{C_1}|C_1)P(z_j^{C_2}|C_2)D_{JS}(P_{z_i}c_1 | P_{z_j}c_2)} \quad (17)$$

where D ($C_1$,$C_2$) is the semantic distance measure, $P(z_i^{C_1}|C_1)$ is a weighting factor representing the probability of latent topic $z_i^{C_1}$ given $C_1$ and $P(z_j^{C_2}|C_2)$ is a weighting factor representing the probability of latent topic $z_j^{C_2}$ given $C_2$. The weighting factors represent the importance (probability, or frequency) of a particular variation of a concept among the images associated with the concept. They are used so that the resulting semantic distance measure is influenced to a greater degree by the variations that are more prevalent in the images of the semantic concepts being measured.

1.4 Image-Based Semantic Distance Given Concept Appearance Variations

Figure 3:
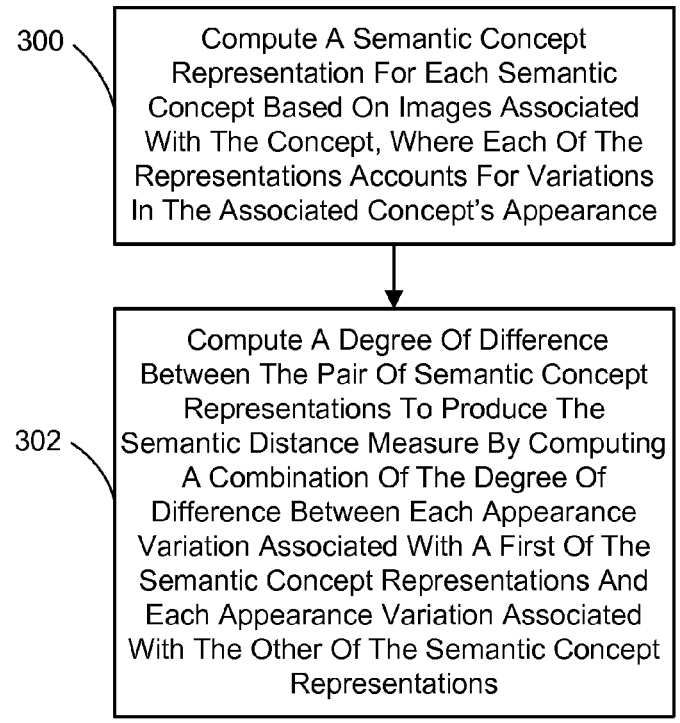
FIG. 3 is a flow diagram generally outlining one embodiment of a process for establishing a measure of an image-based semantic distance between semantic concepts while accounting for concept appearance variations.

In view of the foregoing, embodiments of the image-based semantic distance technique can implemented so as to establish a measure of an image-based semantic distance between a pair of semantic concepts while accounting for concept appearance variations. This is generally illustrated in the exemplary embodiment of FIG. 3. Referring to FIG. 3, a semantic concept representation for each semantic concept is computed based on images associated with the concept, where each of the representations accounts for variations in the appearance of the associated semantic concept as depicted in the images used to compute the representation (300). In some embodiments, computing a semantic concept representation entails using a latent topic visual language model which captures the visual features of the variations in appearance in the form of a conditional distribution for each variation considered, as described above. Once the semantic concept representations are in place, a degree of difference is then computed between the pair of semantic concept representations to produce the semantic distance measure, where the computing entails computing a combination of the degree of differences between each appearance variation associated with a first of the semantic concept representations and each appearance variation associated with the other of the semantic concept representations (302). In some embodiments, the latter task involves computing the difference degree as the square root of a sum of weighted Jensen-Shannon divergences computed between each conditional distribution associated with the first of the semantic concepts and each conditional distribution associated with the other of the semantic concepts. For each Jensen-Shannon divergence computed, the weighting can be based on the importance (probability or frequency) of the variation in the images associated with the conditional distribution of the first semantic concept and the importance of the variation in the images associated with the conditional distribution of the other semantic concept.

2.0 Visual Concept Network

A visual concept network can be constructed using image-based semantic distances. A visual concept network (VCNet) is a graph G(V,E,W), where concepts are nodes $v_i \in V$, i= 1, ..., N and the semantic relationship between two concepts is the edge $e(v_i, v_j) \in E, i, j = 1, \ldots, N$. The image-based semantic distance between the nodes is represented by the length (weight) of the edge $w \in W$. If two concepts have a large image-based semantic distance, the edge between them is long; otherwise short.

To avoid the overlapping of the concept nodes, a force-directed graph layout technique can be adopted. Generally, edges between nodes are represented as an attractive force, while nodes that do not share a tie are pushed apart by some constraint to help prevent overlap.

The VCNet is useful in many multimedia related tasks, such as knowledge representation, multimedia retrieval, and so on. This concept net models the concept relationship in a graphical manner. In addition, it can maintain a much larger and ever increasing corpus. One of the most direct applications of VCNet is concept clustering. This task aims to cluster concepts in the image tags or descriptions to help discover the main topic and summarization about the image. Using VCNet, concepts with semantic connections are more likely to be clustered together. Another application of VCNet is content-based web image/video annotation, where the common paradigm is to annotate the images or video frame by classification. This is done by either considering the concepts are independent to each other, or incorporating the concepts relation into the model. VCNet also has many other potential applications, such as query enpension, annotation refinement, and so on.

3.0 Concept Clustering

Image-based semantic distances can also be used directly for concept clustering. Concept clustering is widely used for topic detection and summarization in the textural domain. There are many tags and descriptions associated with web images. Concept clustering approaches often use these tags and descriptions to detect the main topic or summarization of these images. However, the focus of the topic summarization in an image may not be the same with that for the text. For instance, the image is more likely to focus on the main object or scene, while the text focuses more on the story or point of view of the author. Thus, an applicable concept distance measurement for textual domain may not perform as well as the specific distance measurement for visual domain.

4.0 Image Annotation

Automatically annotating concepts for images is critical in web image retrieval and browsing. Most of the state-of-the-art image annotation approaches detect multiple semantic concepts in an isolated manner, which neglects the fact that the concepts may be correlated to each other. The generative model of the annotation process can be represented as Eq. (18).

$$w^* = \underset{w \subset V}{\operatorname{argmax}} P(w, I_u) \quad (18)$$

where w is the annotation keywords, and w* is the best suitable keyword. $I_u$ represents the unlabeled image. This annotation process equals to the maximization of the joint probability $P(w, I_u)$. The annotation performance may be further boosted with consideration of the concept relations.

Based on this motivation, a Dual Cross-Media Relevance Model (DCMRM) is proposed. This model assumes that the probability of observing the annotation keyword w and the images $I_u$ are mutually independent given a keyword v, and the relevance model is represented as follows.

$$w^* = \underset{w \subset V}{\operatorname{argmax}} \sum_{v \in V} P(I_u | v) P(w | v) P(v) \quad (19)$$

where w and v are two annotation keywords. $P(I_u|v)$ denotes the probability of an untagged image $I_u$ given a word v. $P(w|v)$ denotes the probability of a word w given a word v. The image-based semantic distance is applied to calculate the conditional probability $P(w|v)$.

5.0 The Computing Environment

A brief, general description of a suitable computing environment in which portions of the image-based semantic distance technique embodiments described herein may be implemented will now be described. The technique embodiments are operational with numerous general purpose or special purpose computing system environments or configurations. Examples of well known computing systems, environments, and/or configurations that may be suitable include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 4:
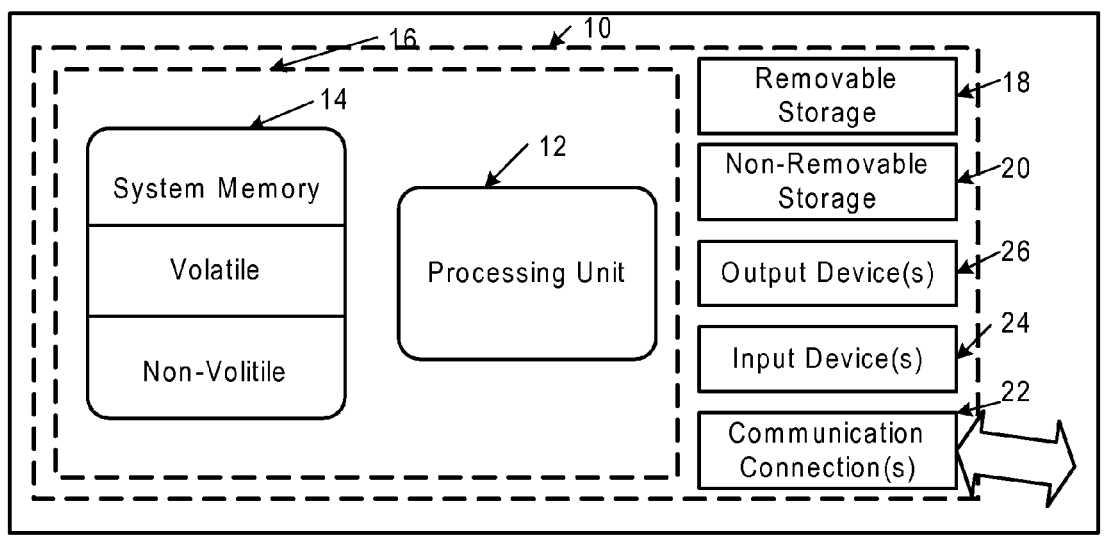
FIG. 4 is a diagram depicting a general purpose computing device constituting an exemplary system for implementing image-based semantic distance technique embodiments described herein.

FIG. 4 illustrates an example of a suitable computing system environment. The computing system environment is only one example of a suitable computing environment and is not intended to suggest any limitation as to the scope of use or functionality of image-based semantic distance technique embodiments described herein. Neither should the computing environment be interpreted as having any dependency or requirement relating to any one or combination of components illustrated in the exemplary operating environment. With reference to FIG. 4, an exemplary system for implementing the embodiments described herein includes a computing device, such as computing device 10. In its most basic configuration, computing device 10 typically includes at least one processing unit 12 and memory 14. Depending on the exact configuration and type of computing device, memory 14 may be volatile (such as RAM), non-volatile (such as ROM, flash memory, etc.) or some combination of the two. This most basic configuration is illustrated in FIG. 4 by dashed line 16. Additionally, device 10 may also have additional features/functionality. For example, device 10 may also include additional storage (removable and/or non-removable) including, but not limited to, magnetic or optical disks or tape. Such additional storage is illustrated in FIG. 4 by removable storage 18 and non-removable storage 20. Computer storage media includes volatile and nonvolatile, removable and non-removable media implemented in any method or technology for storage of information such as computer readable instructions, data structures, program modules or other data. Memory 14, removable storage 18 and non-removable storage 20 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by device 10. Any such computer storage media may be part of device 10.

Device 10 may also contain communications connection(s) 22 that allow the device to communicate with other devices. Device 10 may also have input device(s) 24 such as keyboard, mouse, pen, voice input device, touch input device, camera, etc. Output device(s) 26 such as a display, speakers, printer, etc. may also be included. All these devices are well know in the art and need not be discussed at length here.

The image-based semantic distance technique embodiments described herein may be further described in the general context of computer-executable instructions, such as program modules, being executed by a computing device. Generally, program modules include routines, programs, objects, components, data structures, etc. that perform particular tasks or implement particular abstract data types. The embodiments described herein may also be practiced in distributed computing environments where tasks are performed by remote processing devices that are linked through a communications network. In a distributed computing environment, program modules may be located in both local and remote computer storage media including memory storage devices.

6.0 Other Embodiments

It is noted that any or all of the aforementioned embodiments throughout the description may be used in any combination desired to form additional hybrid embodiments. In addition, although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process for establishing a measure of an image-based semantic distance between semantic concepts, comprising:
using a computer to perform the following process actions:
respectively computing a semantic concept representation for each concept based on images associated with the concept; and
computing a degree of difference between two semantic concept representations to produce said image-based semantic distance measure for the pair of corresponding semantic concepts.

2. The process of claim 1, wherein the semantic concept representations each take the form of a statistical distribution model of the images associated with the corresponding semantic concept.

3. The process of claim 2, wherein the statistical distribution models are visual language models, each of which captures the visual characteristics of the images associated with the corresponding semantic concept.

4. The process of claim 2, wherein the degree of difference between the semantic concept representations takes the form of a statistical distribution divergence.

5. The process of claim 4, wherein the statistical distribution divergence is the square root of a Jensen-Shannon divergence computation between the statistical distribution models.

6. The process of claim 1, wherein at least one of the semantic concepts comprises an object depicted in the images associated with the corresponding concept.

7. The process of claim 1, wherein at least one of the semantic concepts comprises a scene depicted in the images associated with the corresponding concept.

8. The process of claim 1, further comprising the process action of computing an image-based semantic distance measure between each of multiple pairs of semantic concepts, and using the measures to construct a visual concept network comprising a graph having a separate node representing each semantic concept and edges connecting the nodes representing the image-based semantic distance measure computed between each connected node.

9. The process of claim 1, further comprising the process action of computing an image-based semantic distance measure between each of multiple pairs of semantic concepts, and using the measures in a semantic concept clustering application.

10. The process of claim 1, further comprising the process action of computing an image-based semantic distance measure between each of multiple pairs of semantic concepts, and using the measures in an image annotation application.

11. The process of claim 1, wherein the images associated with a concept are obtained via a web-based image pool comprising images that are tagged with terms descriptive of the associated image, wherein said terms relate to said semantic concepts.

12. A system for establishing a measure of an image-based semantic distance between a pair of semantic concepts, comprising:
a general purpose computing device; and
a computer program having program modules executable by said computing device, wherein the computing device is directed by the program modules of the computer program to,
respectively compute a semantic concept representation for each semantic concept based on images associated with the concept, wherein each of said representations accounts for variations in the appearance of the associated semantic concept as depicted in the images used to compute the representation, and
compute a degree of difference between the pair of semantic concept representations to produce said image-based semantic distance measure, wherein computing the degree of difference comprises computing a combination of the degree of difference between each appearance variation associated with a first of the semantic concept representations and each appearance variation associated with the other of the semantic concept representations.

13. The system of claim 12, wherein said variations in appearance are attributable to at least one of differences in scale, orientation, object shape, illumination, color and texture.

14. The system of claim 12, wherein the program module for computing a semantic concept representation comprises a sub-module for computing each semantic concept representation using a latent topic visual language model which captures the visual features of said variations in appearance in the form of a conditional distribution for each variation considered.

15. The system of claim 14, wherein prior to computing the latent topic visual language model for a semantic concept representation, each image associated with the semantic concept of the representation is characterized as a collection of visual words.

16. The system of claim 15, wherein the latent topic visual language model associated with each semantic concept representation is based on parameters generated using at least one n-gram approach, wherein said n-gram approach models the image based on each visual word and n-1 of its neighboring visual words.

17. The system of claim 16, wherein generating the visual words of an image comprises:
dividing the image into uniformly sampled, equal sized patches and using a separated 8-dimensional texture histogram to described each patch, wherein each dimension of the texture histogram comprises a texture gradient along a different one of eight quantized directions; and employing a hash coding approach to convert the texture histogram of each patch to produce a visual word representing the patch.

18. The system of claim 14, wherein the sub-module for computing each semantic concept representation using a latent topic visual language model comprises incorporating a probabilistic latent semantic analysis (pLSA) into the visual language model.

19. The system of claim 14, wherein the program module for computing the degree of difference between a pair of semantic concept representations, comprises a sub-module for computing the difference degree as the square root of a sum of weighted Jensen-Shannon divergences computed between each conditional distribution associated with the first of the semantic concept representations and each conditional distribution associated with the other of the semantic concept representations, wherein for each Jensen-Shannon divergence computed, the weighting is based on the importance of the variation in the images associated with the conditional distribution of the first semantic concept representation and the importance of the variation in the images associated with the conditional distribution of the other semantic concept representation.

20. A computer-implemented process for establishing a measure of an image-based semantic distance between a pair of semantic concepts, comprising using a computer to perform the following process actions:

for each semantic concept, computing a latent topic visual language model based on images associated with the semantic concept, wherein the latent topic visual language model accounts for variations in the appearance of the associated concept in the images used to compute the model, and wherein each variation in appearance it is desired to consider is represented as a separate conditional distribution of the visual features in the images associated with the variation; and computing the square root of a sum of weighted Jensen-Shannon divergences computed between each conditional distribution associated with the latent topic visual language model computed for a first of the pair of semantic concepts and each conditional distribution associated with the latent topic visual language model computed for the other semantic concept, wherein for each Jensen-Shannon divergence computed, the weighting is based on the probability or frequency of the variation in the images associated with the conditional distribution of the first semantic concept and the probability or frequency of the variation in the images associated with the conditional distribution of the other semantic concept.

* * * * *